(12) United States Patent
Nakao et al.

(10) Patent No.: US 11,313,459 B2
(45) Date of Patent: Apr. 26, 2022

(54) GEAR SHIFTING ASSEMBLY OF TRANSMISSION, TRANSMISSION AND AUTOMOBILE

(71) Applicant: ZHEJIANG SIEKON TRANSMISSION TECHNOLOGY CO., LTD, Jiaxing (CN)

(72) Inventors: Akihiro Nakao, Taizhou (CN); Wenyong Yu, Taizhou (CN); Jianhua Jin, Taizhou (CN)

(73) Assignee: ZHEJIANG SIEKON TRANSMISSION TECHNOLOGY CO., LTD., Jiaxing (CN)

( * ) Notice: Subject to any disclaimer, the term of this patent is extended or adjusted under 35 U.S.C. 154(b) by 375 days.

(21) Appl. No.: 16/474,610

(22) PCT Filed: Dec. 25, 2018

(86) PCT No.: PCT/CN2018/123423
§ 371 (c)(1),
(2) Date: Jun. 28, 2019

(87) PCT Pub. No.: WO2019/174356
PCT Pub. Date: Sep. 19, 2019

(65) Prior Publication Data
US 2021/0332881 A1 Oct. 28, 2021

(30) Foreign Application Priority Data
Mar. 13, 2018 (CN) .......................... 201810206126.2

(51) Int. Cl.
*F16H 61/32* (2006.01)
*F16H 61/18* (2006.01)
(Continued)

(52) U.S. Cl.
CPC ............. *F16H 61/32* (2013.01); *F16H 61/18* (2013.01); *F16H 63/18* (2013.01); *F16H 63/32* (2013.01);
(Continued)

(58) Field of Classification Search
CPC .. F16H 61/32; F16H 63/3408; F16H 63/3466; F16H 63/18; F16H 63/3425;
(Continued)

(56) References Cited

FOREIGN PATENT DOCUMENTS

CN           1967018 A      5/2007
CN           101078437 A    11/2007
(Continued)

OTHER PUBLICATIONS

International Search Report issued by the National Intellectual Property Administration acting as the International Searching Authority in relation to International Application No. PCT/CN2018/123423 dated Mar. 26, 2019 (6 pages) along with an English language translation (3 pages).
(Continued)

*Primary Examiner* — Victor L MacArthur
(74) *Attorney, Agent, or Firm* — Maier & Maier, PLLC

(57) ABSTRACT

A gear shifting assembly of a transmission, a transmission, and an automobile. The present disclosure aims to address the problem of complicated structure existing in a gear shifting assembly or the like. To this end, the gear shifting assembly of a transmission according to the present disclosure includes a P-gear mechanism and a forward-gear mechanism, wherein the gear shifting assembly further includes a drive mechanism and a shifting mechanism, and the shifting mechanism is configured to be capable of switching the drive mechanism so that the P-gear mechanism or the forward-gear mechanism is in an operational state. By employing the common drive mechanism, the
(Continued)

gear-shifting function of forward gears and the function of parking at the P-gear can be realized without interference, and on the basis of function integration, elements are saved so that the gear shifting assembly is made more compact in structure.

9 Claims, 11 Drawing Sheets

(51) Int. Cl.
*F16H 63/18* (2006.01)
*F16H 63/32* (2006.01)
*F16H 63/34* (2006.01)
*F16H 61/28* (2006.01)
(52) U.S. Cl.
CPC ..... *F16H 63/3408* (2013.01); *F16H 63/3425* (2013.01); *F16H 63/3466* (2013.01); *F16H 2061/2869* (2013.01); *F16H 2063/321* (2013.01)
(58) Field of Classification Search
CPC .... F16H 63/32; F16H 61/18; F16H 2063/321; F16H 2061/2869; F16H 63/3491; F16H 63/3433; F16H 63/3416
See application file for complete search history.

(56) References Cited

FOREIGN PATENT DOCUMENTS

| CN | 202144863 U | 2/2012 | |
|---|---|---|---|
| CN | 206600457 U | 10/2017 | |
| CN | 108533698 A | 9/2018 | |
| CN | 208295091 U | 12/2018 | |
| DE | 102014018469 A1 * | 6/2016 | ............. F16H 63/38 |
| DE | 102015224285 A1 | 6/2017 | |
| JP | 2011196521 A | 10/2011 | |

OTHER PUBLICATIONS

International Search Report issued by the State Intellectual Property Office acting as the International Searching Authority in relation to International Application No. PCT/CN2018/123423 dated Mar. 26, 2019 (6 pages).
Written Opinion of the International Searching Authority issued by the State Intellectual Property Office acting as the International Searching Authority in relation to International Application No. PCT/CN2018/123423 dated Apr. 4, 2019 (5 pages).

* cited by examiner

GEAR SHIFTING ASSEMBLY OF TRANSMISSION, TRANSMISSION AND AUTOMOBILE

CROSS-REFERENCE TO RELATED APPLICATIONS

This application is a national phase entry under 35 U.S.C. 371 of PCT International Application No. PCT/CN2018/123423 filed Dec. 25, 2018, which claims priority to Chinese Patent Application No. 201810206126.2 filed Mar. 13, 2018, the disclosure of each of these applications is expressly incorporated herein by reference in their entirety.

TECHNICAL FIELD

The present disclosure relates to the field of automobiles, and in particular to a gear shifting assembly of a transmission, a transmission, and an automobile.

BACKGROUND

With the development of the automobile industry, automatic transmissions are becoming more and more used in automobile transmission systems as a key component of automobile power transmission, and gear shifting mechanisms among the forward gears and the P gear in transmissions also tend to be complicated in structure.

As one of the solutions currently in use, the shifting among the forward gears and the P gear is realized by means of a hydraulic system, which inevitably requires the addition of such components as a high-pressure oil pump and an actuating piston as well as a complicated oil path system in the transmission. Therefore, this solution has the following defects: 1) complicated structure and a large number of elements, leading to high manufacture cost; 2) the arrangement of the high-pressure oil pump not only increases the risk of oil leakage, which thereby leads to increase of the risk of transmission failure and deterioration of reliability of the entire automobile, but also increases additional power loss, which inevitably results in higher maintenance costs at later stages. Another current solution is to use motor control, in which separate motors are mostly used to control shifting among the forward gears as well as parking at the P gear, therefore resulting in the defects of complicated structure and large space occupied. Moreover, the engagement mode using motor control cannot achieve smoothness as good as the hydraulic control mode.

Accordingly, there is need in the art for a novel gear shifting assembly of a transmission to address the above problems.

SUMMARY

In order to address the above problems in the related art, that is, to address the problem of structural complexity or the like of gear shifting assemblies, a first aspect of the present disclosure provides a gear shifting assembly of a transmission, including a P-gear mechanism and a forward-gear mechanism, wherein the gear shifting assembly further includes a drive mechanism and a shifting mechanism, and the shifting mechanism is configured to be capable of switching the drive mechanism so that the P-gear mechanism or the forward-gear mechanism is in an operational state.

By connecting the P-gear mechanism and the forward-gear mechanism to the shifting mechanism respectively, the common drive mechanism can move the P-gear mechanism and the forward-gear mechanism in a manner associated with each other by driving the shifting mechanism, and said movement associated with each other only allows one of the P-gear mechanism and the forward-gear mechanism to be in the operational state. That is to say, by employing the common drive mechanism, the gear-shifting function of forward gears and the function of parking at the P-gear can be realized without interference, and elements are saved so that the gear shifting assembly is made more compact in structure. With such an arrangement, the drive mechanism consumes energy only at the time of gear shifting, resulting in low energy consumption and high efficiency of energy utilization. For example, the drive mechanism can be a low-power drive motor.

In a preferred technical solution of the aforementioned gear shifting assembly, a power output end of the drive mechanism is connected with a transmission shaft, the shifting mechanism includes a P-gear cam and a gear shifting cam each disposed on the transmission shaft, and curved surfaces of the contours of the P-gear cam and the gear shifting cam satisfy the following condition: switching to a parking state is not allowed in the process of shifting the forward gears by the gear shifting cam.

In a preferred technical solution of the aforementioned gear shifting assembly, the curved surface of the contour of the P-gear cam includes a first P-gear curved surface segment and a second P-gear curved surface segment distributed in a circumferential direction of the transmission shaft, the curved surface of the contour of the gear shifting cam includes a first gear-shifting curved surface segment and a second gear-shifting curved surface segment distributed in the circumferential direction of the transmission shaft, and positional relationship of the first P-gear curved surface segment, the second P-gear curved surface segment, the first gear-shifting curved surface segment and the second gear-shifting curved surface segment in the circumferential direction of the transmission shaft are set to not allow switching to the parking state in the process of shifting of the forward gears by the gear shifting cam.

By reasonably designing the positional relationship of the first P-gear curved surface segment, the second P-gear curved surface segment, the first gear-shifting curved surface segment and the second gear-shifting curved surface segment in the circumferential direction of the transmission shaft, the gear-shifting function of forward gears and the function of parking at the P-gear can be realized without interference. Since switching to the parking state is not allowed in the process of shifting the forward gears by the gear shifting cam, locking force can be reduced and parking reliability can be improved.

It can be understood that, in the case that the foregoing two functions are implemented without interference, those skilled in the art can flexibly set the specific forms of the various curved surface segments upon actual requirements. For example, the (first and second) P-gear curved surface segments can be equally or unequally divided in the circumferential direction of the transmission shaft, and widths of the (first and second) P-gear curved surface segments in an axial direction of the transmission shaft and depths thereof in a radial direction can be the same or different.

For example, in the process of parking, a cam groove is a circular arc groove segment with a constant curvature, such as a part of a circular ring structure wound on the gear shifting cam, wherein while one end of a shift fork is sliding in the circular arc groove segment, the other end of the shift fork engages with a forward-gear assembly and the automobile is always at the lowest gear (the first gear). On the other hand, in the process of shifting the forward gears, the cam groove is an arc groove with a varying curvature, such as a spiral groove segment wound on the gear shifting cam, wherein while the one end of the shift fork is sliding in the spiral groove segment, the other end of the shift fork engages with a different position of the forward-gear assembly so that the automobile is at a different forward gear.

In a preferred technical solution of the aforementioned gear shifting assembly, the first gear-shifting curved surface segment has curvatures inconsistent in the circumferential direction of the transmission shaft, and an extension range thereof corresponds to an operational rotation angle of the gear shifting cam; the first P-gear curved surface segment has curvatures consistent in the circumferential direction of the transmission shaft, and an extension range thereof corresponds to a non-operational rotation angle of the P-gear cam, wherein a stroke of the P-gear cam is in the first P-gear curved surface segment while a stroke of the gear shifting cam is in the first gear-shifting curved surface segment.

Under the premise that the forward-gear shifting function can be satisfied, those skilled in the art, upon actual conditions, can flexibly set specific variation forms of the curvatures of the first gear-shifting curved surface segment by making reference to experimental data, experiences, analysis, and specific structural form of the forward-gear mechanism.

In a preferred technical solution of the aforementioned gear shifting assembly, the gear shifting cam has an operational rotation angle ranging from 0 to 180°, and the P-gear cam has an operational rotation angle ranging from 0 to −180°.

In a preferred technical solution of the aforementioned gear shifting assembly, the forward-gear mechanism includes a shift fork and a forward-gear assembly, wherein one end of the shift fork is slidably disposed in a cam groove of the gear shifting cam, and the other end of the shift fork is connected to the forward-gear assembly such that the forward-gear assembly can be at different forward gears as the shift fork slides when a stroke of the gear shifting cam is in the first gear-shifting curved surface segment.

In a preferred technical solution of the aforementioned gear shifting assembly, the curved surfaces of the contours of the P-gear cam and the gear shifting cam satisfy the following condition: switching to a parking state is allowed in the case where the gear shifting cam is at the lowest gear.

By reasonably setting the curved surfaces of the contours of the P-gear cam and the gear shifting cam, gear shifting of forward gears and parking can be realized reliably without interference. In addition, before parking, the forward gear should be set at a low gear, which can reduce locking force of the gear shifting assembly, thus improving reliability of the P-gear parking.

For example, in the process of shifting the forward gears, a stroke groove is a circular arc groove segment with a constant curvature, and a P-gear assembly is always in a disengaged state when one end of a P-gear link is sliding within the circular arc groove segment, that is, a pawl associated with the other end of the P-gear link keeps disengaged from a P-gear disc. On the other hand, during the parking process, the stroke groove is an arc groove segment with a varying curvature, and the P-gear assembly and the P-gear disc are always in an engaged state when the one end of the P-gear link is sliding within the arc groove segment, that is, the pawl associated with the other end of the P-gear link is kept in a locked state with the P-gear disc.

In a preferred technical solution of the aforementioned gear shifting assembly, the second gear-shifting curved surface segment has curvatures consistent in the circumferential direction of the transmission shaft, and an extension range thereof corresponds to a non-operational rotation angle of the gear shifting cam; the second P-gear curved surface segment has curvatures inconsistent in the circumferential direction of the transmission shaft, and an extension range thereof corresponds to an operational rotation angle of the P-gear cam, wherein a stroke of the gear shifting cam is in the second gear-shifting curved surface segment and always corresponds to a position of the lowest gear when a stroke of the P-gear cam is in the second P-gear curved surface segment.

Similar to the aforementioned first gear-shifting curved surface segment, under the premise that the parking function can be satisfied, those skilled in the art, upon actual conditions, can flexibly set specific variation forms of the curvatures of the second P-gear curved surface segment by making reference to experimental data, experiences, analysis, and specific structural form of the P-gear mechanism.

In a preferred technical solution of the gear shifting assembly, the power output end of the drive mechanism is connected to the transmission shaft via a reduction gear, the P-gear cam is disposed in a middle portion of a gear disc of a driven gear of the reduction gear and forms a stroke groove with the driven gear, and the P-gear mechanism includes a P-gear link and a P-gear assembly, wherein one end of the P-gear link is slidably disposed in the stroke groove, and the other end of the P-gear link is connected to the P-gear assembly, such that the P-gear assembly can be in a disengaged state from or an engaged state with a P-gear disc of the automobile as the P-gear link swings when the stroke of the P-gear cam is in the first P-gear curved surface segment or the second P-gear curved surface segment.

In a preferred technical solution of the gear shifting assembly, the P-gear cam and the driven gear of the reduction gear are of a one-piece structure.

For example, those skilled in the art can improve the driven gear of the speed reducer, so that a combined structure of the P-gear cam and the driven gear is actually equivalent to a cam having a cam groove structure and provided with cam teeth at the outer side. Of course, the two can be processed separately and then fixedly connected.

In a preferred technical solution of the gear shifting assembly, the gear shifting cam is disposed on the transmission shaft in such a manner as to be movable within a set range in an axial direction of the transmission shaft.

In a preferred technical solution of the gear shifting assembly, two ends of the gear shifting cam are respectively provided with an elastic assembly, the elastic assemblies are fixed to the transmission shaft, and the elastic assemblies have a set pre-tightening force in the axial direction of the transmission shaft so that the gear shifting cam is always fixed to the transmission shaft when the gear shifting cam moves to any position within a set range in the axial direction of the transmission shaft.

In a preferred technical solution of the gear shifting assembly, the elastic assembly includes a spring seat and a spring mounted on the spring seat, wherein an inner side of the spring seat abuts a cam shaft of the gear shifting cam, an outer side of the spring seat is fixed to the transmission shaft by a stop ring, and the spring has a set pre-tightening force in the axial direction of the transmission shaft.

With such an arrangement, in the case where mechanisms such as a clutch plate, a shift fork or the like are worn, axial compensation can be achieved; that is, axial displacement of the gear shifting cam increases service life of the assembly. In the case of large manufacture tolerances, axial displacement can be automatically adjusted, that is, the manufacturing processability is improved by the axial displacement of the gear shifting cam. The pair of elastic assemblies, with their pre-tightening forces, reliably clamp the gear shifting cam in the axial direction of the transmission shaft, thereby ensuring the reliability of power transmission. In addition, when the drive motor rotates, the elastic assemblies play a certain buffering role. Specifically, the impact in the gear shifting process can be effectively reduced, thereby ensuring smoothness in the gear shifting process and further reducing possibility of overload of the motor. As a result, it is possible to use a drive motor having a relative small nominal power. It can be understood that the above-mentioned spring seat and spring are only illustrative of the elastic assembly, and any structure capable of realizing the above-mentioned axial compensation function can be used as the elastic assembly in the present disclosure and can be flexibly selected by those skilled in the art as actually required.

It can be seen that in the preferred technical solutions of the present disclosure, by adding a P-gear cam and a gear shifting cam coaxially disposed, the function of shifting forward gears and the parking function can be realized by only one common drive mechanism, thereby saving elements, making the structure compact and reducing the space occupied. Specifically, the relationship between the curved surfaces of the contours of the P-gear cam and the gear shifting cam is reasonably set, so that the stroke of the P-gear link does not change during the shifting of the forward gears; in the process of realizing the parking function, position of the shift fork on the curved surface of the contour of the gear shifting cam corresponds to a low gear; that is, before parking, a low gear has to be shifted to, which reduces the locking force required by the shifting mechanism and improves the parking reliability. In addition, providing elastic assemblies at both ends of the gear shifting cam can buffer and compensate the forward gear to a certain degree, thus improving the process performance and prolonging the service life cycle of the gear shifting assembly.

A second aspect of the present disclosure further provides a transmission, including the gear shifting assembly according to any one of the preceding technical solutions.

A third aspect of the present disclosure further provides an automobile, including the gear shifting assembly according to any one of the preceding technical solutions, or including the transmission according to any one of the preceding technical solutions.

It should be noted that both the above-described transmission and the automobile have all the aforementioned technical effects of the gear shifting assembly of the transmission, which will not described repeatedly herein.

BRIEF DESCRIPTION OF THE DRAWINGS

The gear shifting assembly of the transmission of the present disclosure will be described below with reference to the accompanying drawings in connection with the forward gears including only the first gear and the second gear. In the drawings.

LIST OF REFERENCE SIGNS

Figure 1A:
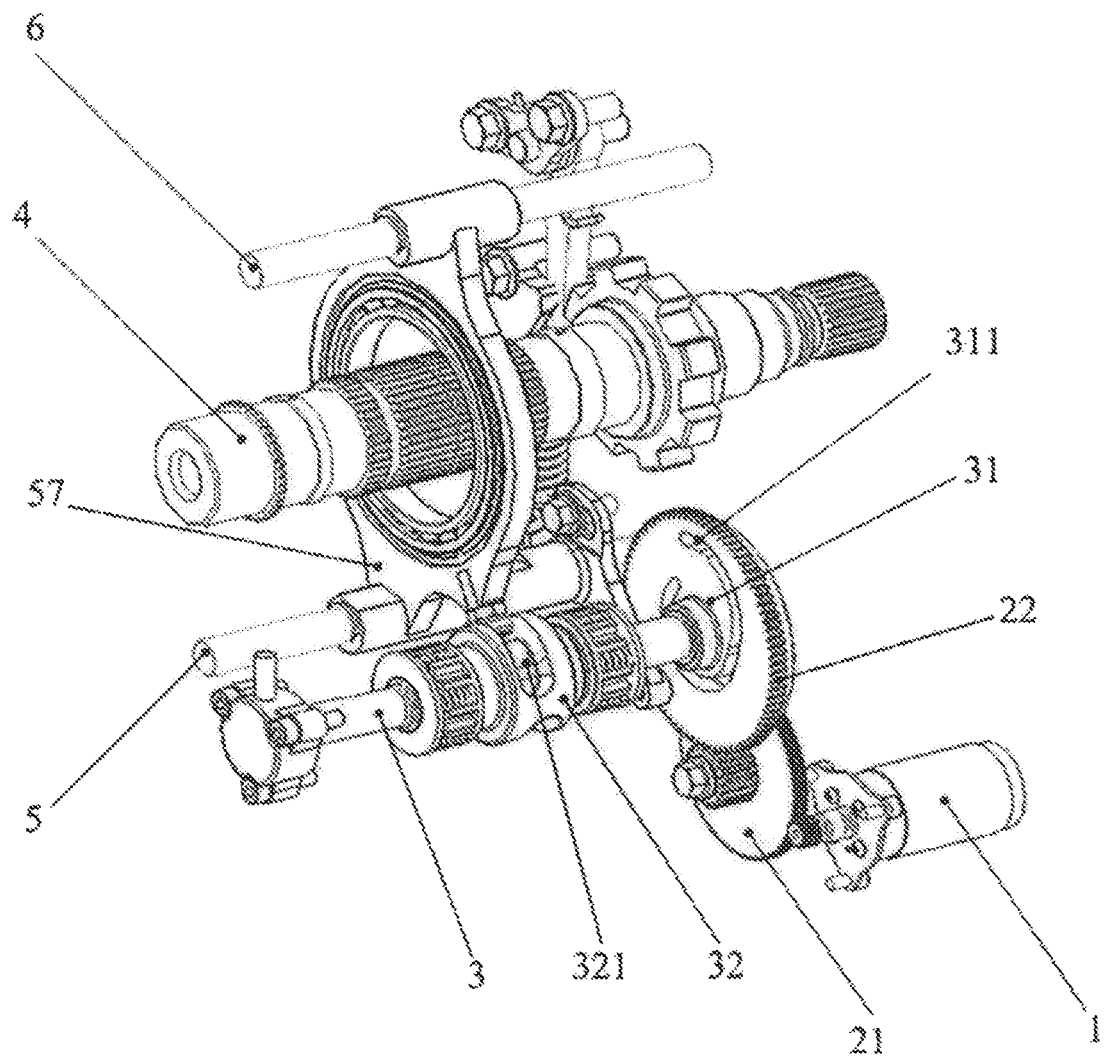
FIG. 1A is a first schematic view showing the assembling of a gear shifting assembly of a transmission according to an embodiment of the present disclosure.

1. drive motor; 21. primary reduction gear; 22. secondary reduction gear; 3. first transmission shaft; 31. P-gear cam; 311. stroke groove; 312. first keyway; 313. first flat key; 314. first stop ring; 32. gear shifting cam; 321. cam groove; 322. second keyway; 323. second flat key; 33. elastic assembly; 331. spring seat; 332. spring; 333. second stop ring; 4. second transmission shaft; 41. P-gear disc; 5. first mounting shaft; 51. P-gear link; 52. P-gear push rod; 521. compression spring; 53. support seat; 54. roller; 55. pawl; 56. return spring; 57. shift fork; 58. bearing; 6. second mounting shaft.

DETAILED DESCRIPTION OF THE EMBODIMENTS

Preferred embodiments of the present disclosure will be described hereinafter with reference to the accompanying drawings. It should be understood by those skilled in the art that these embodiments are only used to explain the technical principles of the present disclosure, and are not intended to limit the scope of protection of the present disclosure. For example, although the forward gears in the drawings include only the first gear and the second gear and the reduction gear includes the primary reduction gear and the secondary reduction gear, it is merely an exemplary description, which can be adjusted by those skilled in the art as required for adaption to specific application scenes. For example, the forward gears may include three or five gears, etc., and/or the reduction gear may include a third-stage reduction gear or the like.

It should be noted that in the description of the present disclosure, the terms "center", "upper", "lower", "left", "right", "vertical", "horizontal", "inner side", "outer side"

and the like that indicate directional or positional relationship are based on the directional or positional relationship shown in the drawings, which, merely for convenience of description, do not indicate or imply that the device or element involved must have the specific orientation or be configured and operated in the specific orientation. Therefore, they shall not be construed as limiting the present disclosure. Moreover, the terms "first," "second," and "third" are used for descriptive purposes only and shall not be construed as indicating or implying their relative importance.

In addition, it should be noted that in the description of the present disclosure, the terms "mount", "connect with", and "connect" should be construed in a broad sense, unless explicitly specified or defined otherwise. For example, the connection may be fixed connection, detachable connection, or integral connection, may be mechanical connection or electrical connection, may be direct connection or indirect connection via an intermediate medium, and may also be internal communication between two elements. For those skilled in the art, the specific meanings of the above terms in the present disclosure can be understood on a case-by-case basis.

In addition, numerous specific details are provided in the following specific embodiments in order to set forth the present disclosure better. Those skilled in the art should appreciate that the present disclosure can be carried out even without some specific details. In some examples, in order to highlight the spirit of the present disclosure, methods, means, elements and circuits that are well-known to those skilled in the art are not described in detail.

Since the P-gear mechanism is used only during parking and the forward-gear shifting mechanism is used only in the driving process, the timings of use thereof are different, and thus it is possible for them to share the same one drive motor. In view of this, the present disclosure adopts a single-motor driving solution, integrating the forward-gear shifting function of the transmission and the P-gear parking function into one functional unit.

Figure 1B:
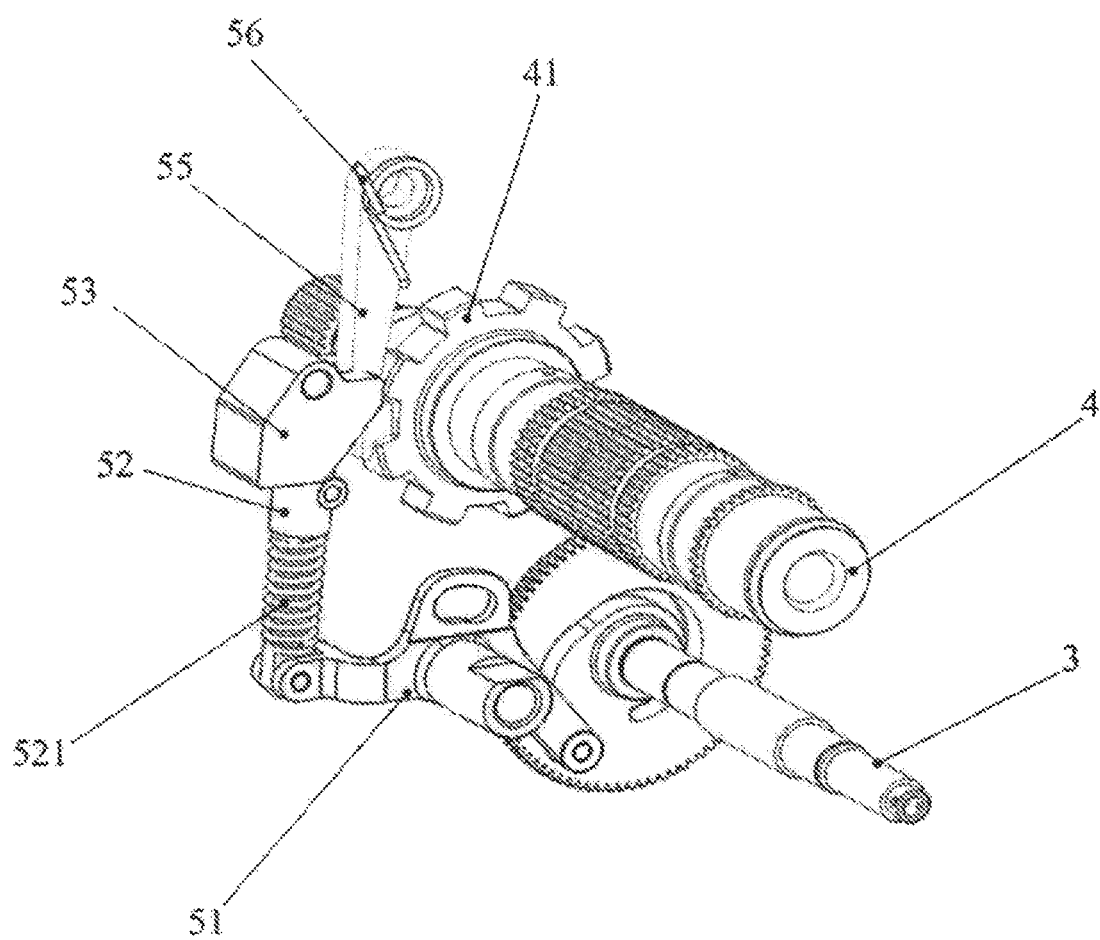
FIG. 1B is a second schematic view showing the assembling of a gear shifting assembly of a transmission according to an embodiment of the present disclosure.

Firstly, referring to FIG. 1A and FIG. 1B, FIG. 1A is a first schematic view showing the assembling of a gear shifting assembly of a transmission according to an embodiment of the present disclosure, and FIG. 1B is a second schematic view showing the assembling of a gear shifting assembly of a transmission according to an embodiment of the present disclosure. As shown in FIG. 1A and FIG. 1B, a common drive motor 1 drives a first transmission shaft 3 to rotate by a reduction gear set, and a P-gear cam 31 and a gear shifting cam 32 are both disposed on the first transmission shaft 3 in such a manner as to be rotatable in synchronization with the first transmission shaft 3. Exemplarily, the reduction gear set includes a primary reduction gear 21 as a drive gear and a secondary reduction gear 22 as a driven gear, and the P-gear cam 31 is disposed in the middle of a gear disc of the secondary reduction gear 22 and forms a stroke groove 311 with the secondary reduction gear 22, wherein the P-gear cam 31 cannot slide in an axial direction of the first transmission shaft 3, while the gear shifting cam 32 can slide within a set range in the axial direction of the first transmission shaft 3. A second transmission shaft 4 capable of outputting power to automobile wheels is provided with a P-gear disc 41 and a shift fork 57, movement of an end of the shift fork 57 in a cam groove 321 of the gear shifting cam 32 can make the shift fork 57 slide in an axial direction of the second transmission shaft 4 to accomplish shifting between the first gear and the second gear, and movement of an end of a P-gear link 51 in the stroke groove 311 can engage or disengage a pawl 55 with or from the P-gear disc 41 to accomplish P-gear parking or release the parking.

Figure 2:
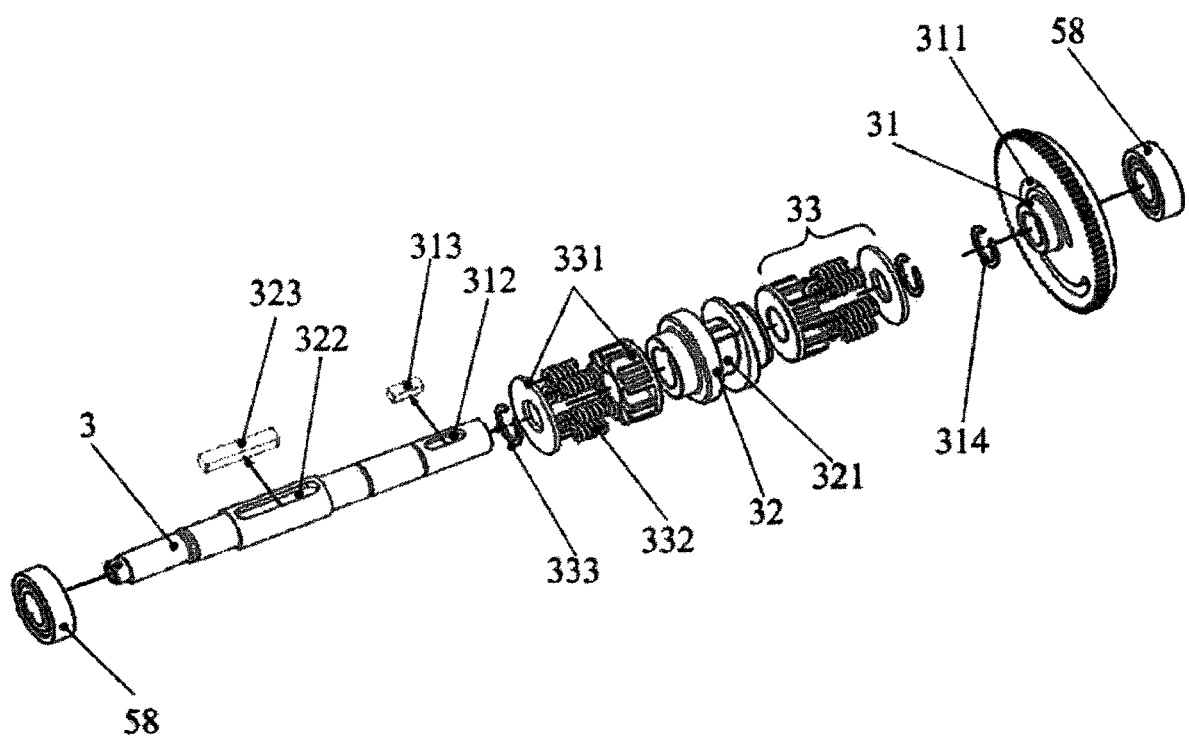
FIG. 2 is a schematic exploded view of an elastic assembly and a gear shifting cam of a gear shifting assembly of a transmission according to an embodiment of the present disclosure.

Secondly, referring to FIG. 2, FIG. 2 is a schematic exploded view of an elastic assembly and a gear shifting cam of a gear shifting assembly of a transmission according to an embodiment of the present disclosure. As shown in FIG. 2, the P-gear cam 31 and the gear shifting cam 32 are respectively connected to the first transmission shaft 3 by the engagement of a first flat key 313 with a first keyway 312 as well as the engagement of a second flat key 323 with a second keyway 322. The first transmission shaft 3 is assembled onto the automobile via bearings 58 at both ends. The P-gear cam 31 is fixed to the first transmission shaft 3 by the engagement of a first stop ring 314 with a ring groove in the first transmission shaft. Since the second keyway 322 in an inner wall of the gear shifting cam 32 that engages with the second flat key 323 is an axial through-groove, the gear shifting cam 32 is allowed to slide in the axial direction of the first transmission shaft 3. It can be understood that the above-mentioned engagement of the second keyway and the second flat key is only an exemplary implementation to achieve the function of "allowing the gear shifting cam to slide in the axial direction of the first transmission shaft", and any other reasonable connection method can be used as a connection method for achieving this function. Preferably, an elastic assembly 33 is mounted on both sides of the gear shifting cam 32, respectively. The elastic assemblies are fixed to the first transmission shaft 3 and have a certain pre-tightening force for pre-compressing the gear shifting cam 32 and thereby limiting the sliding of the gear shifting cam 32 on the first transmission shaft 3 within a set range. With the pair of elastic assemblies, the gear shifting cam 32 can be stably clamped on the first transmission shaft 3 wherever it slides on the first transmission shaft 3.

Still referring to FIG. 2, exemplarily, the elastic assembly 33 includes a spring seat 331 and a spring 332 mounted on the spring seat 331, wherein an inner side of the spring seat 331 abuts a cam shaft of the gear shifting cam 32, and an outer side of the spring seat 331 is fixed to the first transmission shaft 3 via a second stop ring 333. For example, the transmission shaft 3 is provided with a ring groove matching with the second stop ring 333, and the spring seat can be immobilized on the first transmission shaft 3 by clamping the second stop ring clamped on the outer side of the spring seat into the ring groove.

The functions of the elastic assemblies disposed on both sides of the gear shifting cam include: 1) buffering when the drive motor rotates, effectively preventing the motor from being overloaded due to an impact in the shifting process, whereby a drive motor with a small power can be used; 2) axial compensation in the event of wear of such mechanisms as the clutch plate and the shift fork; and 3) automatic adjustment of axial displacement in the event of large manufacture tolerances, thereby effectively preventing components from being damaged due to interference between different mechanisms and improving the manufacturing processability.

Figure 3A:
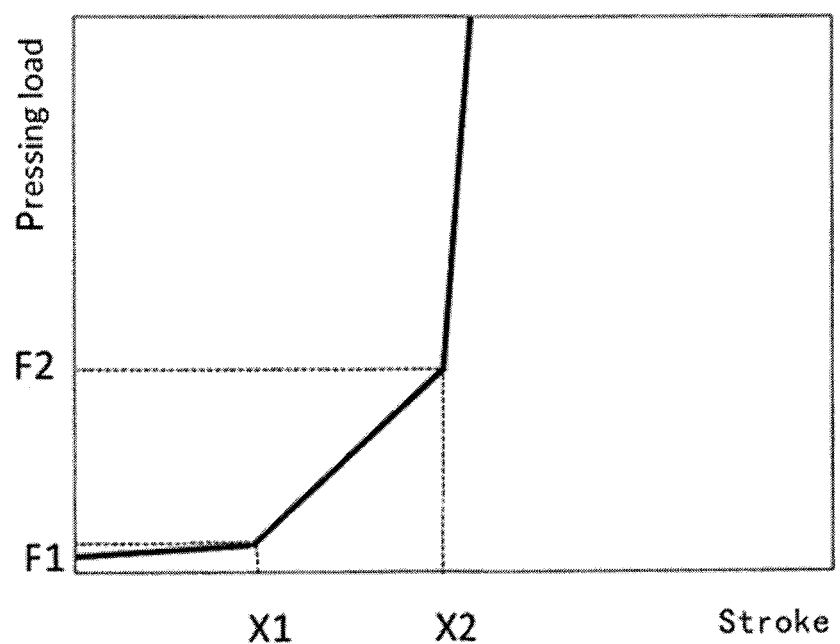
FIG. 3A is a schematic view showing a fitting characteristic of a shifting clutch.
Figure 3B:
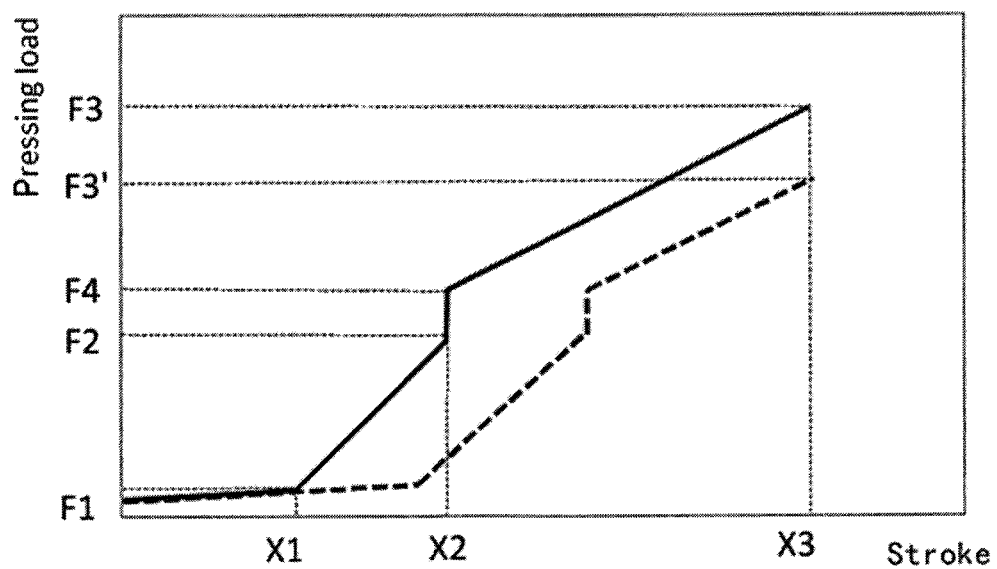
FIG. 3B is a schematic view showing a load characteristic of a gear shifting cam.

The function of the pair of elastic assemblies in the case of clutch wear and rotation angle error of the gear shifting cam will be described below with reference to FIGS. 3A and 3B. FIG. 3A is a schematic view showing a fitting characteristic of a shifting clutch, and FIG. 3B is a schematic view showing a load characteristic of a gear shifting cam. As shown in FIG. 3A, when the shifting clutch is not fitted, that is, when the stroke of the shift fork with respect to the second transmission shaft is between 0 and X1, the end of the shift fork is subject to a small pressing load and the load at X1 is F1; the stroke X1-X2 is the phase in which the clutch is gradually fitted, and the clutch is completely fitted when the stroke is X2. In this process, the pressing load on the end of the shift fork gradually increases and the load at X2 is F2. Thereafter, since the clutch has been completely fitted, the shift fork would not be further displaced even if the cam groove exerts a larger pressing load on the end of the shift fork due to the rotation of the gear shifting cam. As shown by the solid line in FIG. 3B, in the case where the clutch is completely fitted, the clutch can be locked without slipping as long as the force that the elastic assemblies pressing the both sides of the gear shifting cam apply to the shift fork is greater than F2 (such as F4 in FIG. 3B). In the case where the gear shifting cam is subject to a rotation angle error, after the clutch is completely fitted, if the shift fork continues to move in the cam groove until its stroke relative to the second transmission shaft is X3, the gear shifting cam slides by a certain amount on the first transmission shaft under the action of the pair of elastic assemblies pressing the both sides of the gear shifting cam to achieve a balance of forces. If a force greater than F4, i.e., F3, can be applied to the gear shifting cam, the clutch can still be locked without slipping in this case. As shown by the broken line in FIG. 3B, in the case where the clutch wears and the gear shifting cam has a rotation angle error, on the one hand, since the fit displacement of the clutch changes, the strokes of the clutch of "not fitted-gradually fitted-completely fitted" have been correspondingly prolonged respectively. That is, the broken line portion in FIG. 3B moves to the right by a certain amount with respect to the solid line portion in abscissa. In this case, when the gear shifting cam is subject to a rotation angle error, the elastic assembly can provide the gear shifting cam with a force greater than F4, i.e., F3', so that the clutch can also be locked without slipping in this case.

Next, the operation principle of the gear shifting assembly of the present disclosure will be briefly described with reference to FIGS. 4A, 4B and FIGS. 5A, 5B and 5C.

Figure 4A:
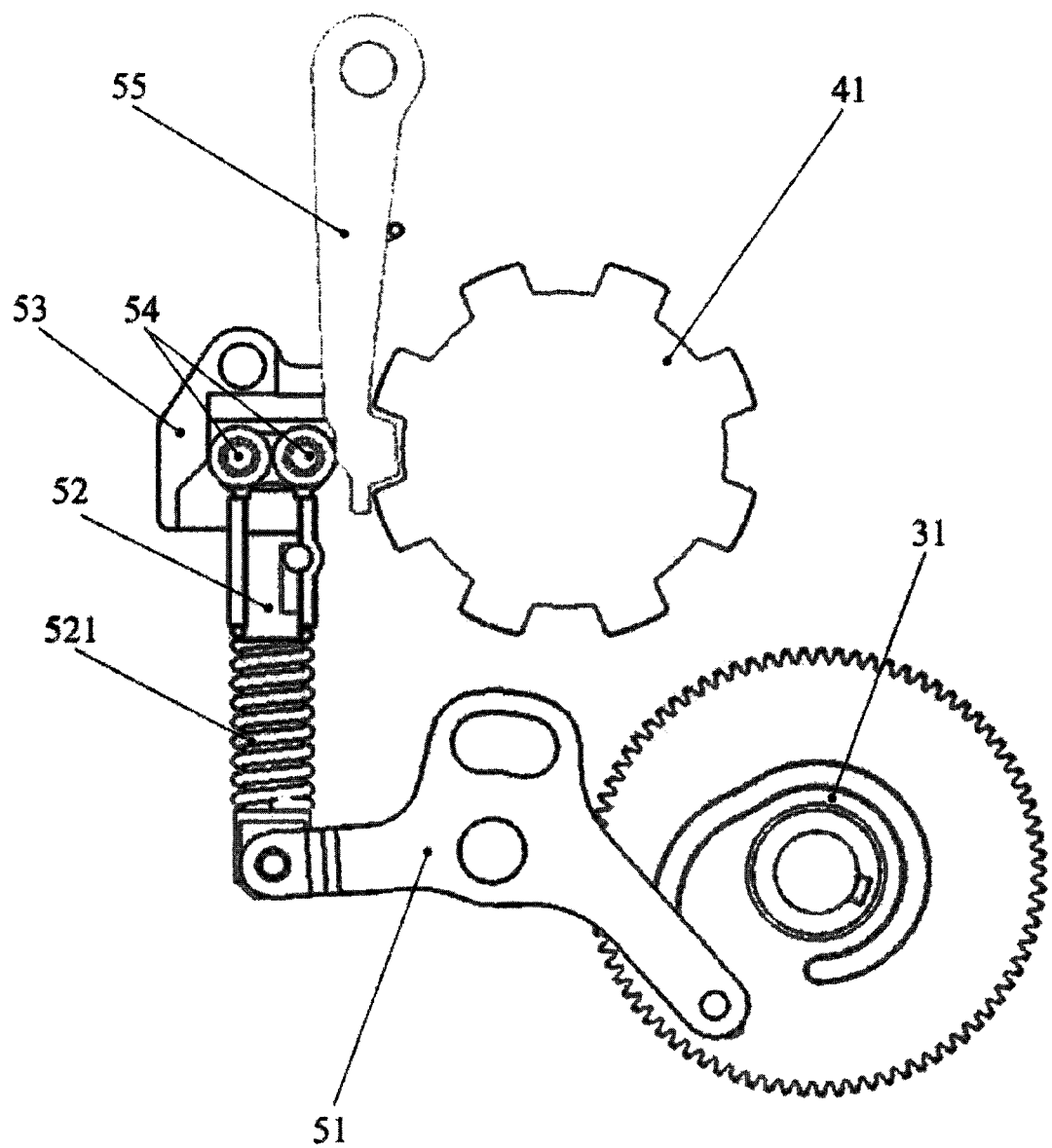
FIG. 4A is a schematic state view showing a P-gear cam of a gear shifting assembly of a transmission according to an embodiment of the present disclosure in a parking state.
Figure 4B:
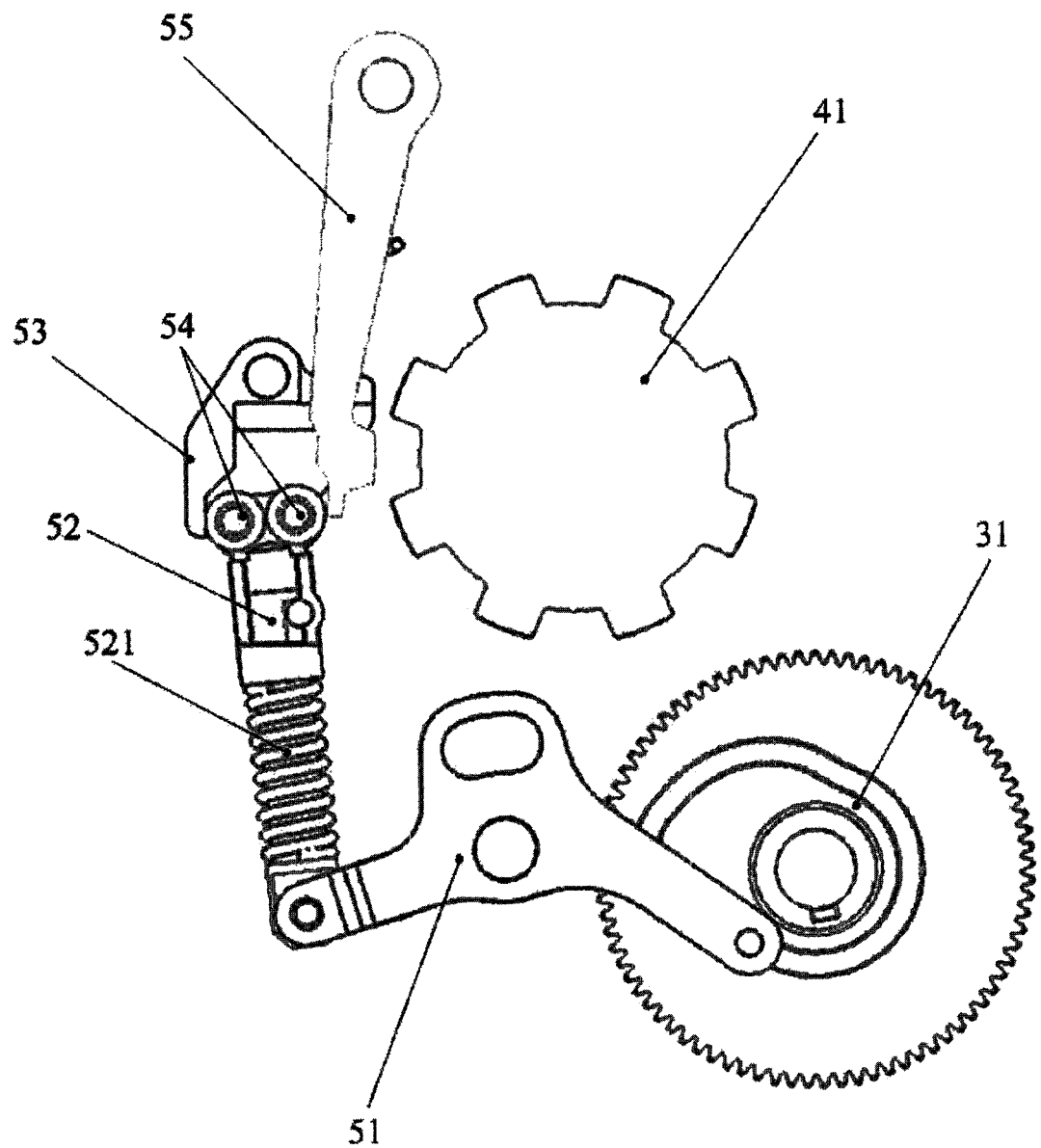
FIG. 4B is a schematic state view showing a P-gear cam of a gear shifting assembly of a transmission according to an embodiment of the present disclosure in a non-parking state.

Firstly, referring to FIGS. 4A and 4B and also to FIG. 1B, FIG. 4A is a schematic state view showing a P-gear cam of a gear shifting assembly of a transmission according to an embodiment of the present disclosure in a parking state, and FIG. 4B is a schematic state view showing a P-gear cam of a gear shifting assembly of a transmission according to an embodiment of the present disclosure in a non-parking state. As shown in FIGS. 4A and 4B, the P-gear parking function of the automobile is realized by movement of a P-gear assembly caused by the swing of the P-gear link 51 caused by rotation of the P-gear cam 31. The P-gear assembly mainly includes a P-gear push rod 52 connected to the P-gear link 51 and configured with a compression spring 521, a support seat 53 having a track and connected to the P-gear push rod 52, a pair of rollers 54 provided in the support seat 53, a pawl 55 with a return spring 56, and a P-gear disc 41 engageable with the pawl 55, one of the rollers 54 being able to roll along the track in the support seat 53 when pushed by the P-gear push rod 52, the other being able to push the pawl 55 to engage it with the P-gear disc 41. Specifically, referring to FIG. 4A and in accordance with the orientation of FIG. 4A, the P-gear cam 31 rotates in the arc groove segment with a varying curvature→the left side of the P-gear link 51 is swung upward→the upper end of the P-gear push rod 52 is moved upward→the roller 54 on the left side rolls upward from the lower side in a combined direction of a vertically upward direction and an obliquely upward direction in the track on the left side of the support seat 53→the roller 54 on the right side presses the pawl 55 until the elastic force of the return spring 56 is overcome so that the pawl 55 engages with the P-gear disc 41 to achieve locking of the P-gear disc 41, thereby achieving the P-gear parking function. Referring to FIG. 4B and in accordance with the orientation of FIG. 4B, the P-gear cam 31 rotates in a circular arc groove segment with a constant curvature→the pawl 55 rotates clockwise under the elastic force of the return spring 56, and the pawl 55 and the P-gear disc 41 are disengaged, releasing the P-gear parking function→the roller 54 on the right side pushes the roller 54 on the left side to roll downward from the lower side in a combined direction of a vertically downward direction and an obliquely downward direction in the track on the left side of the support seat 53. After the release, the P-gear link 51 rarely swings with the rotation of the P-gear cam, and the P-gear push rod 52 also stays in the current state until the P-gear cam rotates to the arc groove of a varying curvature and then the P gear is engaged again to lock for parking. The function of the compression spring 521 on the P-gear push rod 52 is mainly to ensure that the pawl and the P-gear disc can reliably achieve the locking. Specifically, in the process of parking, that is, when the pawl and the P-gear disc are not accurately locked, pre-pressing is effected so that the pawl is pushed to a positon for locking with the P-gear disc by the roller on the right side. When the automobile slips to cause rotation of the P-gear disc, the P-gear disc, by means of the pawl, enables the roller to tend to move downward. At this point, the tendency can be eliminated by the upward elastic force of the compression spring, thereby reliably locking the P-gear disc and the pawl.

It can be understood that the P-gear link and the P-gear assembly described above are only illustrative of the P-gear mechanism. Under the premise that the P-gear cam can realize the parking function during the operational rotation angle thereof, those skilled in the art can flexibly set the specific forms of the P-gear link and the P-gear assembly as required, and can also set the P-gear mechanism to have other structural forms.

Figure 5A:
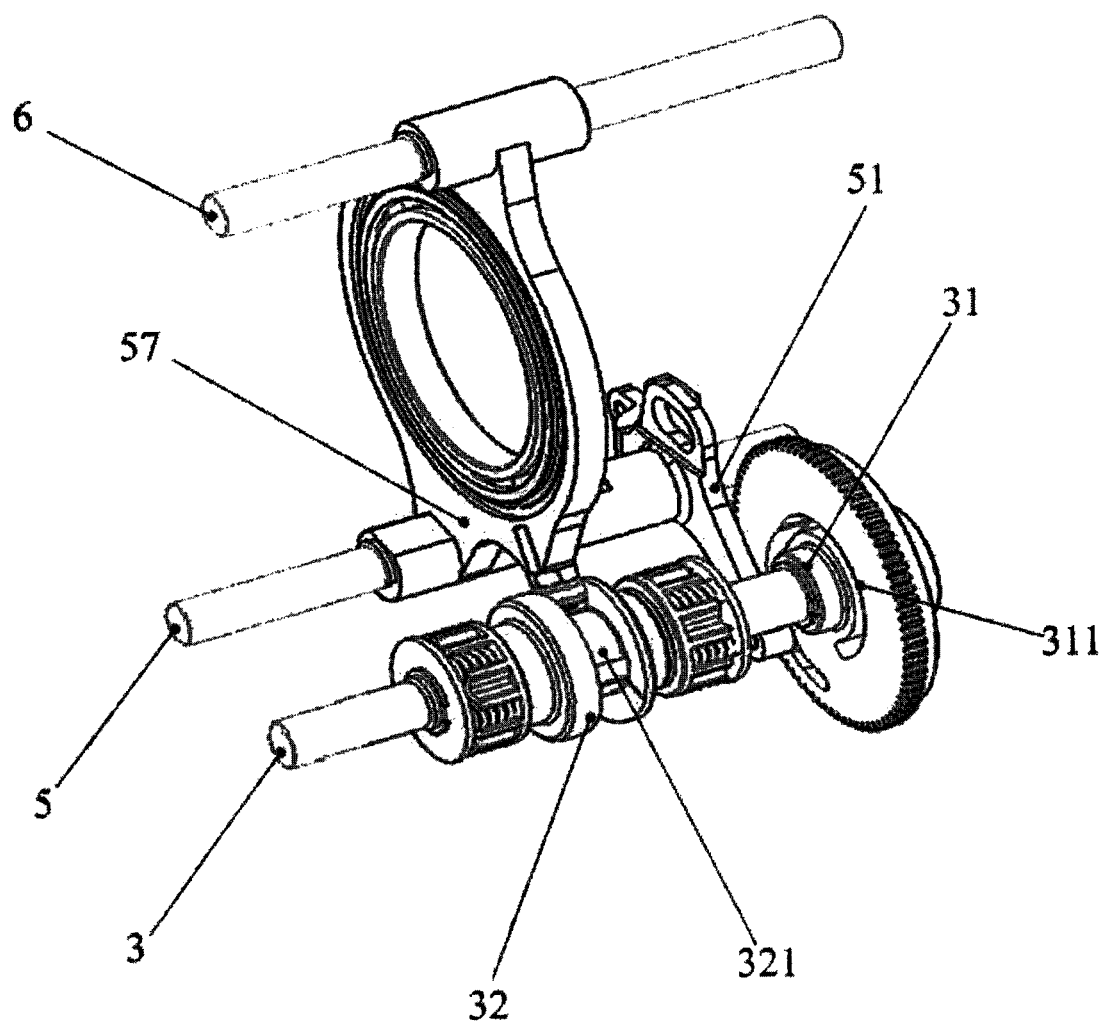
FIG. 5A is a schematic state view showing a gear shifting cam of a gear shifting assembly of a transmission according to an embodiment of the present disclosure in a parking state.
Figure 5B:
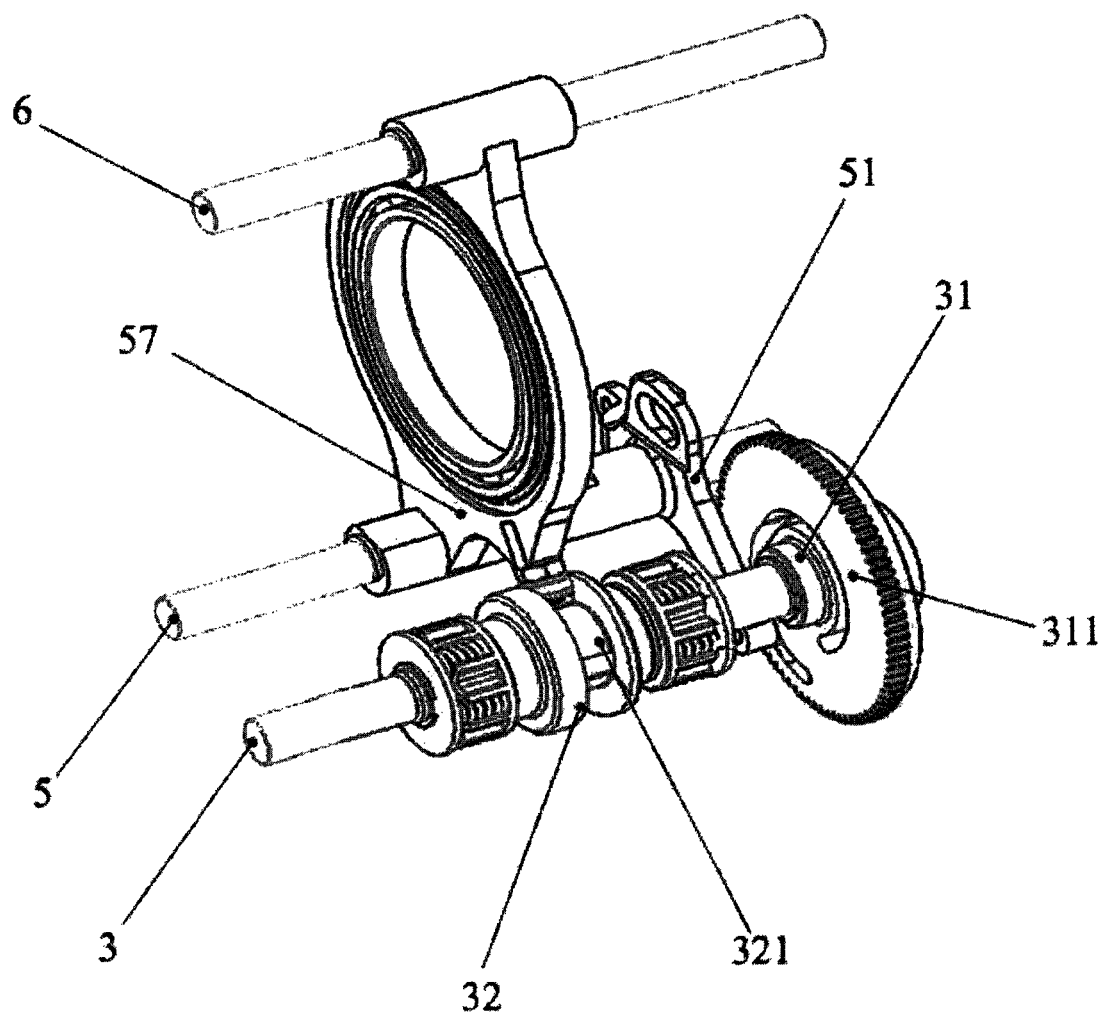
FIG. 5B is a schematic state view showing a gear shifting cam of a gear shifting assembly of a transmission according to an embodiment of the present disclosure when at a first gear.
Figure 5C:
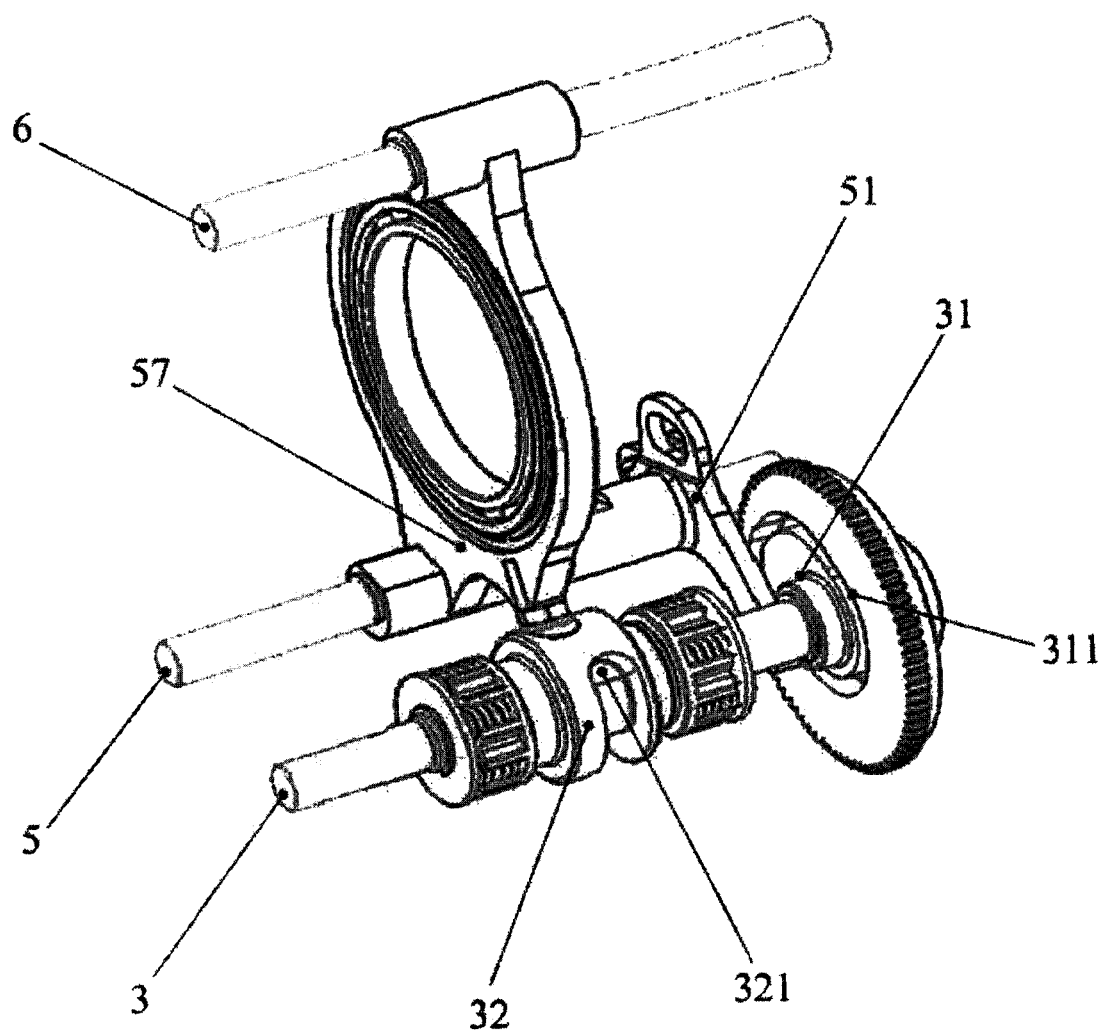
FIG. 5C is a schematic state view showing a gear shifting cam of a gear shifting assembly of a transmission according to an embodiment of the present disclosure when at a second gear.

Secondly, referring to FIGS. 5A, 5B and 5C, FIG. 5A is a schematic state view showing a gear shifting cam of a gear shifting assembly of a transmission according to an embodiment of the present disclosure in a parking state; FIG. 5B is a schematic state view showing a gear shifting cam of a gear shifting assembly of a transmission according to an embodiment of the present disclosure when at a first gear; and FIG. 5C is a schematic state view showing a gear shifting cam of a gear shifting assembly of a transmission according to an embodiment of the present disclosure when at a second gear. The gear shifting function of the forward gear is achieved in such a manner that the P-gear cam rotates to drive the gear shifting cam so that the gear shifting cam is rotated to move the shift fork to positions engaging with different gears, thereby achieving shifting of gears. As shown in FIG. 5A, during the parking of the automobile, the end of the P-gear link 51 slides in the arc groove with a varying curvature of the stroke groove 311 of the P-gear cam 31, and at this point, the end of the shift fork 57 is always in the circular arc groove with a constant curvature of the cam groove 321 of the gear shifting cam 32. As shown in FIG. 5B, in the process of the automobile driving forward at the first gear, the end of the P-gear link 51 slides in the circular arc groove with a constant curvature of the stroke groove 311 of the P-gear cam 31, that is, the P-gear disc and the pawl are in a disengaged state. At this point, the end of the shift fork 57 is always in the circular arc groove with a constant curvature of the cam groove 321 of the gear shifting cam 32. As shown in FIG. 5C, when the automobile needs to be switched from the first gear to the second gear to drive forward, the end of the P-gear link 51 keeps sliding in the circular arc groove with a constant curvature of the stroke groove 311 of the P-gear cam 31, that is, the P-gear disc and the pawl are in a disengaged state. At this point, the end of the shift fork 57 can slide in the spiral groove with a varying curvature of the cam groove 321 of the gear shifting cam 32 to achieve the shifting of the gears.

In other words, when the forward-gear shifting function is realized, the rotation of the reduction gear drives the rotation of the P-gear cam to further rotate the gear shifting cam. As the gear shifting cam rotates, the shift fork moves in the axial direction of the transmission shaft, so that each gear in the forward-gear assembly exhibits a different gear ratio when power is transmitted to the automobile wheels, that is, achieving the shifting between gears of different forward gears. In this period, the pawl and the P-gear disc are always in a disengaged state.

Figure 6:
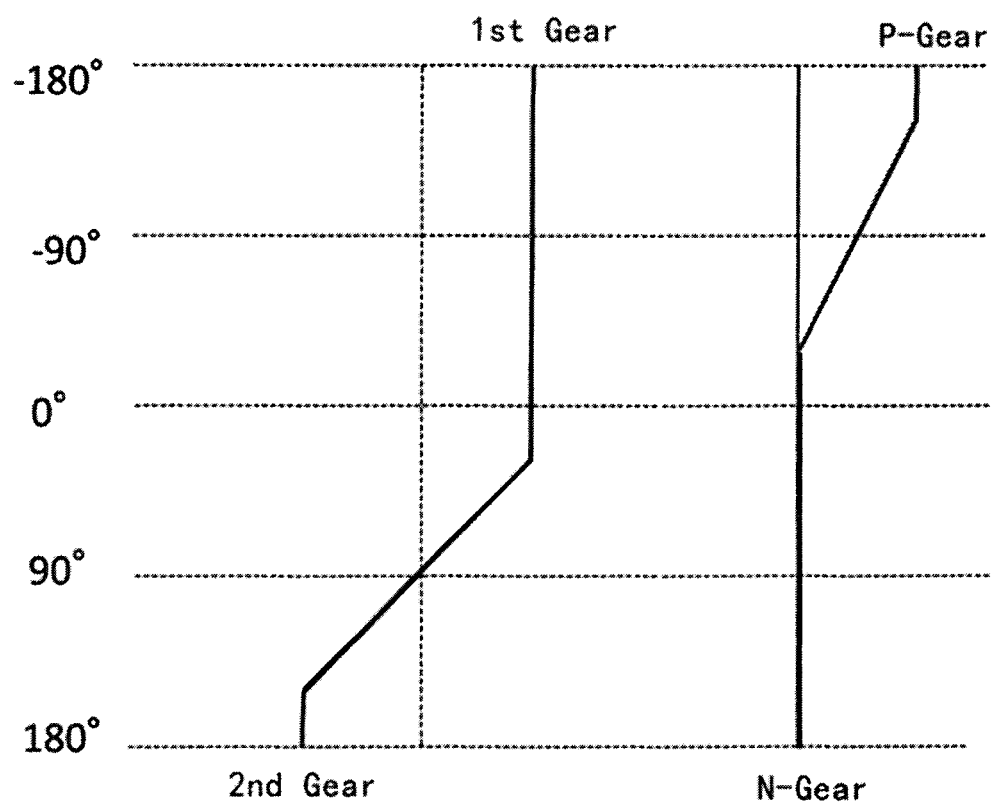
FIG. 6 is a diagram showing a relationship between curved surfaces of the contours of a P-gear cam and a gear shifting cam of a gear shifting assembly of a transmission according to an embodiment of the present disclosure, which shows rotation angle between the P-gear cam and the gear shifting cam in different states.

Preferably, in the gear shifting assembly of the present disclosure, during the P-gear parking, the forward gear corresponding to the gear shifting cam is always in the position of the first gear. That is, the P-gear parking is realized when the forward gear is at the low gear, such as the lowest gear, so as to achieve the purpose of reducing locking force and improving parking reliability. Finally, the principle of implementing the low gear parking of the present disclosure will be described with reference to FIGS. 4A, 5C and 6. FIG. 6 is a diagram showing a relationship between curved surfaces of the contours of a P-gear cam and a gear shifting cam of a gear shifting assembly of a transmission according to an embodiment of the present disclosure, which shows rotation angle between the P-gear cam and the gear shifting cam in different states. The curved surface of the contour of the P-gear cam includes a first P-gear curved surface segment and a second P-gear curved surface segment distributed in the circumferential direction of the transmission shaft, wherein the first P-gear curved surface segment has curvatures consistent in the circumferential direction of the transmission shaft and its extension range corresponds to the non-operational rotation angle of the P-gear cam. The parking function cannot be realized when the P-gear cam is at the non-operational rotation angle. The second P-gear curved surface segment has curvatures inconsistent in the circumferential direction of the transmission shaft and its extension range corresponds to the operational rotation angle of the P-gear cam. The parking function can be realized when the P-gear cam is at the operational rotation angle. The curved surface of the contour of the gear shifting cam includes a first gear-shifting curved surface segment and a second gear-shifting curved surface segment distributed in the circumferential direction of the transmission shaft, wherein the first gear-shifting curved surface segment has curvatures inconsistent in the circumferential direction of the transmission shaft and its extension range corresponds to the operational rotation angle of the gear shifting cam. The gear shifting function of the forward gears can be realized when the shifting cam is at the operational rotation angle. The second gear-shifting curved surface segment has curvatures consistent in the circumferential direction of the transmission shaft and its extension range corresponds to the non-operational rotation angle of the gear shifting cam. The gear shifting function of the forward gears cannot be realized when the gear shifting cam is at the non-operational rotation angle. In order to realize the forward-gear shifting function and the parking function without interference, when the stroke of the gear shifting cam is in the first gear-shifting curved surface segment, the stroke of the P-gear cam should be in the first P-gear curved surface segment, and only when the stroke of the gear shifting cam is in the second gear-shifting curved surface segment, the stroke of the P-gear cam can be in the second P-gear curved surface segment. In order to achieve low-gear parking, when the stroke of the P-gear cam is in the second P-gear curved surface segment, the position of the forward gear corresponding to the second gear-shifting curved surface segment should be a low-gear position.

Referring to FIG. 4A and in accordance with the orientation of FIG. 4A, in a specific example, the first P-gear curved surface segment is a circular arc segment having no curvature variation on the right side of the stroke groove of the P-gear cam, and the second P-gear curved surface segment is a segment having a varying curvature on the left side of the stroke groove of the P-gear cam. Referring to FIG. 5C and in accordance with the orientation of FIG. 5C, in a specific example, the first gear-shifting curved surface segment is a segment having a varying curvature on the inner side of the cam groove of the gear shifting cam, and the second gear-shifting curved surface segment is a circular arc segment having no curvature variation on the outer side of the cam groove of the gear shifting cam.

Referring to FIG. 6, in the driving process of the automobile, the range of the rotation angle of the transmission shaft corresponds to the range of the operational rotation angle of the gear shifting cam, specifically, 0 to 180°. That is, when the gear shifting cam is rotated within the range of 0 to 180°, the cam groove can move the shift fork by means of the rotation of the gear shifting cam to achieve gear shifting of the forward gears. In this period, the P-gear cam is at a non-operational rotation angle, that is, the rotation of the P-gear cam does not swing the P-gear link to cause a change of the stroke. In this way, in the process of shifting the forward gears of the automobile by the rotation of the gear shifting cam, parking does not occur due to the simultaneous rotation of the P-gear cam. That is to say, when the forward gears are shifted in the driving process of the automobile, the right end of the P-gear link (FIG. 4A) always moves in the circular arc segment with a constant curvature of the stroke groove of the P-gear cam, and thus the pawl and the P-gear disc are always in a disengaged state throughout the driving process of the automobile.

With continued reference to FIG. 6, in the parking process of the automobile, the range of the rotation angle of the transmission shaft corresponds to the range of the operational rotation angle of the P-gear cam, specifically, 0 to −180°. That is, the P-gear cam, in the process of rotating from 0 to −180°, gradually achieves the locking of the pawl with the P-gear disc and thereby achieves the parking. In this period, the gear shifting cam is at the non-operational rotation angle, that is, the rotation of the gear shifting cam does not move the shift fork to cause a change in stroke. In this way, in the process of parking the automobile through the rotation of the P-gear cam, the end of the shift fork always moves in the circular arc segment with a constant curvature of the cam groove of the gear shifting cam. Accordingly, it is impossible to shift the forward gears due to the simultaneous rotation of the gear shifting cam. Moreover, the shift fork is always in a state engaging with the gears of the first gear in the parking process. As can be seen from FIG. 6, the pawl begins to lock with the P-gear disc at approximately −30°, and they are substantially locked at approximately −150°. In this period, the gear shifting cam is at the non-operational rotation angle, and thus the rotation of the gear shifting cam does not cause shifting of the forward gears. In addition, when the angle is approximately −180° to 30°, the forward gear corresponding to the rotation of the gear shifting cam is the first gear, that is, the forward gear is always in the first-gear position during the P-gear parking.

In the gear shifting assembly of the present disclosure, when the automobile is started and switched into the forward gear, the P gear is automatically disengaged, and the shifting of the forward gears is realized by the rotation of the gear shifting cam in the driving process. When it is required to park, firstly the forward gear shall be shifted back to the first gear before the shifting to the P gear, and then the P-gear parking is achieved by the rotation of the P-gear cam.

Still referring to FIG. 1 and in accordance with the orientation of FIG. 1, the shift fork 57 is assembled onto the transmission housing of automobile through a first mounting shaft 5 and a second mounting shaft 6. A sleeve portion in the middle of the P-gear link 51 is sleeved over the first mounting shaft 5. That is, the P-gear link and the upper portion of the forward-gear shifting mechanism share one mounting shaft, which reduces the number of elements. The reduction of the number of elements simplifies the structure, reduces the weight, lowers the manufacture cost, and reduces the overall space occupied by the assembly inside the automobile. On the basis of the integration of the P-gear parking and the forward-gear shifting function, the reduction of the number of elements in the present disclosure is also reflected in the following aspects: 1) the P-gear parking function and the forward-gear shifting function are implemented by one drive motor only; 2) the P-gear cam and the driven gear of the reduction gear set, i.e., the second reduction gear, are designed to be of a one-piece structure; and 3) the P-gear cam and the gear shifting cam share the first transmission shaft 3.

It can be seen that in a preferred technical solution of the present disclosure, the integration of the P-gear parking function and the forward-gear shifting function is achieved by one common drive motor. Providing the gear shifting cam with a pair of elastic assemblies can perform buffering function during the shifting, can play an axial compensation role in the case of wear of the mechanisms and can automatically adjust the axial displacement in the case of large manufacture tolerances. By reasonably designing the curved surfaces of the contours of the P-gear cam and the gear shifting cam, the transmission achieves the smoothness of conventional automatic transmissions which use a hydraulic control system.

Heretofore, the technical solutions of the present disclosure have been described in connection with the preferred embodiments shown in the drawings. However, it will be appreciated by those skilled in the art that the scope of protection of the present disclosure is obviously not limited to the specific embodiments. Those skilled in the art can make equivalent modifications or substitutions to the related technical features without departing from the principles of the present disclosure. The modifications and substitutions will fall within the scope of protection of the present disclosure.

What is claimed is:

1. A gear shifting assembly of a transmission, comprising a P-gear mechanism and a forward-gear mechanism, wherein the gear shifting assembly further comprises a drive mechanism and a shifting mechanism, wherein a power output end of the drive mechanism is connected with a transmission shaft, and the shifting mechanism comprises a P-gear cam and a gear shifting cam each disposed on the transmission shaft, wherein the curved surface of the contour of the P-gear cam comprises a first P-gear curved surface segment and a second P-gear curved surface segment distributed in a circumferential direction of the transmission shaft, and the curved surface of the contour of the gear shifting cam comprises a first gear-shifting curved surface segment and a second gear-shifting curved surface segment distributed in the circumferential direction of the transmission shaft, wherein the first gear-shifting curved surface segment has curvatures inconsistent in the circumferential direction of the transmission shaft, and an extension range thereof corresponds in circumferential manner to an operational rotation angle of the gear shifting cam; the first P-gear curved surface segment has curvatures consistent in the circumferential direction of the transmission shaft, and an extension range thereof corresponds to a non-operational rotation angle of the P-gear cam, wherein a moving path of the P-gear cam is in the first P-gear curved surface segment while a moving path of the gear shifting cam is in the first gear-shifting curved surface segment, wherein the second gear-shifting curved surface segment has curvatures consistent in the circumferential direction of the transmission shaft, and an extension range thereof corresponds to a non-operational rotation angle of the gear shifting cam; the second P-gear curved surface segment has curvatures inconsistent in the circumferential direction of the transmission shaft, and an extension range thereof corresponds to an operational rotation angle of the P-gear cam, wherein a moving path of the gear shifting cam is in the second gear-shifting curved surface segment and always corresponds to a position of a lowest gear when a moving path of the P-gear cam is in the second P-gear curved surface segment, wherein the power output end of the drive mechanism is connected to the transmission shaft via a reduction gear set, the P-gear cam is disposed in a middle portion of a gear disc of a driven gear of the reduction gear set and forms a moving path groove with the driven gear, wherein the P-gear cam and the driven gear of the reduction gear are of a one-piece structure.

2. The gear shifting assembly according to claim 1, wherein the gear shifting cam has an operational rotation angle ranging from 0 to 180°, and the P-gear cam has an operational rotation angle ranging from 0 to −180°.

3. The gear shifting assembly according to claim 1, wherein the forward-gear mechanism comprises a shift fork, wherein one end of the shift fork is slidably disposed in a cam groove of the gear shifting cam, such that the transmission can be at different forward gears as the shift fork slides when a moving path of the gear shifting cam is in the first gear-shifting curved surface segment.

4. The gear shifting assembly according to claim 1, wherein the P-gear mechanism comprises a P-gear link and a P-gear assembly, wherein one end of the P-gear link is slidably disposed in the moving path groove, and the other end of the P-gear link is connected to the P-gear assembly, such that the P-gear assembly can be in a disengaged state from or an engaged state with a P-gear disc of the automobile as the P-gear link swings when the moving path of the P-gear cam is in the first P-gear curved surface segment or the second P-gear curved surface segment.

5. The gear shifting assembly according to claim 1, wherein the gear shifting cam is disposed on the transmission shaft in such a manner as to be movable within a set range in an axial direction of the transmission shaft.

6. The gear shifting assembly according to claim 5, wherein two ends of the gear shifting cam are respectively provided with an elastic assembly, the elastic assemblies are fixed to the transmission shaft, and the elastic assemblies have a set pre-tightening force in the axial direction of the transmission shaft so that the gear shifting cam is always fixed to the transmission shaft when the gear shifting cam moves to any position within the set range in the axial direction of the transmission shaft.

7. The gear shifting assembly according to claim 6, wherein the elastic assembly comprises a spring seat and a spring mounted on the spring seat, an inner side of the spring seat abuts a cam shaft of the gear shifting cam, an outer side of the spring seat is fixed to the transmission shaft by a stop ring, and the spring has a set pre-tightening force in the axial direction of the transmission shaft.

8. The transmission according to claim 1.

9. An automobile, comprising the transmission according to claim 8.

\* \* \* \* \*